(12) United States Patent
Ogasawara et al.

(10) Patent No.: US 7,538,513 B2
(45) Date of Patent: May 26, 2009

(54) STEP MOTOR DRIVE CIRCUIT AND ANALOG ELECTRONIC TIMEPIECE

(75) Inventors: Kenji Ogasawara, Chiba (JP); Yoshihiro Shibuya, Chiba (JP)

(73) Assignee: Seiko Instruments Inc. (JP)

( * ) Notice: Subject to any disclaimer, the term of this patent is extended or adjusted under 35 U.S.C. 154(b) by 111 days.

(21) Appl. No.: 11/703,015

(22) Filed: Feb. 6, 2007

(65) Prior Publication Data
US 2007/0188124 A1    Aug. 16, 2007

(30) Foreign Application Priority Data
Feb. 15, 2006   (JP)   .............. 2006-037835

(51) Int. Cl.
*H02P 8/00*   (2006.01)
(52) U.S. Cl. .................. 318/696; 318/685; 368/76
(58) Field of Classification Search ............ 318/696, 318/685, 217, 218, 219; 368/157
See application file for complete search history.

(56) References Cited

U.S. PATENT DOCUMENTS

| | | | | |
|---|---|---|---|---|
| 4,430,007 A | * | 2/1984 | Wiget et al. ............... 368/157 |
| 4,433,918 A | * | 2/1984 | Nishimura et al. ............ 368/74 |
| 4,760,564 A | * | 7/1988 | Odagiri ........................ 368/66 |
| 5,195,063 A | * | 3/1993 | Moriya .......................... 368/85 |
| 6,108,279 A | * | 8/2000 | Hara .......................... 368/157 |
| 6,946,813 B2 | * | 9/2005 | Manaka ...................... 318/685 |

* cited by examiner

*Primary Examiner*—Bentsu Ro
*Assistant Examiner*—David S Luo
(74) *Attorney, Agent, or Firm*—Adams & Wilks

(57) ABSTRACT

A step motor drive circuit has a first transistor pair having first and transistors, a second transistor pair having third and fourth transistors, and fifth and sixth transistors connected in parallel with the first and third transistors, respectively. A driving circuit alternately drives the first transistor pair and the second transistor pair to an ON state in a state of rotating the motor (first stated), and shortcircuits drive terminals of the motor by driving the first and third transistors to an ON state and driving the second and the fourth transistors to an OFF state in a state of braking the motor (second state). The driving circuit drives the fifth transistor to an ON state when the first transistor is driven to the ON state in the second state of the motor, drives the sixth transistor to an ON state when the third transistor is driven to the ON state in the first state of the motor, and drives the sixth transistor to an OFF state when the third transistor is driven to an ON state in the second state of the motor. The fifth transistor and the sixth transistor function as protecting transistors that protect the first to fourth transistors by increasing the electrostatic resistance thereof.

20 Claims, 10 Drawing Sheets

STEP MOTOR DRIVE CIRCUIT AND ANALOG ELECTRONIC TIMEPIECE

BACKGROUND OF THE INVENTION

1. Field of the Invention

The present invention relates to a step motor drive circuit and an analog electronic timepiece.

2. Description of the Prior Art

In a background art, there is utilized an analog electronic timepiece for driving to rotate a time hand for indicating time of an hour hand, a minute hand or the like by a step motor. The analog electronic timepiece includes the step motor for driving to rotate the time hand and a step motor drive circuit for driving to rotate the step motor and is constituted to indicate time by the time hand by driving to rotate the step motor by the step motor drive circuit based on a time signal constituting a reference of time (refer to, for example, JP-B-57-18440 and JP-B-63-18149).

FIG. 10 is a circuit diagram of the step motor drive circuit used for the analog electronic timepiece of the background art.

In FIG. 10, the step motor drive circuit includes a first transistor pair comprising a P-channel field effect transistor (FET) 21 and an N-channel field effect transistor 25, a second transistor pair comprising a P-channel field effect transistor 24 and an N-channel field effect transistor 22, driving means (not illustrated) for driving the respective transistors ON/OFF and N-channel field effect transistors 20, 23 respectively connected in parallel with the transistors 21, 24 for a countermeasure of electrostatic resistance. The transistors 20, 23 are always brought into an OFF state.

The step motor drive circuit is constituted by an integrated circuit (IC), and a connection point of the transistors 21, 22 and a connection point of the transistors 24, 25 constitute output terminals Out1, Out2 of the integrated circuit and connected with drive terminals of a step motor 26 for an electronic timepiece.

The driving means rotate the step motor 26 in a predetermined direction by supplying an alternating signal to the step motor 26 by driving the first transistor pair and the second transistor pair alternately in an ON state in driving to rotate the motor. That is, in driving to rotate the motor, the driving means drive the first transistor pair and the second transistor pair alternately in the ON state by bringing the transistors 21, 25 into the ON state and driving the transistors 24, 22 to the OFF state, successively, and by bringing the transistors 24, 22 into the ON state and driving the transistors 21, 25 to the OFF state. Thereby, the step motor 26 is driven to rotate in the predetermined direction by supplying the alternating signal to the step motor 26.

Further, in braking the motor for forcibly holding the step motor 26 at a predetermined rotational position, the driving means short circuit both terminals of the step motor 26 by driving the transistors 21, 24 to the ON state and driving the transistors 22, 25 to the OFF state.

The transistors 20, 23 are maintained always in the OFF state, thereby, the transistors 21, 22, 24, 25 can be protected against destruction or deterioration by static electricity.

However, the transistors 20, 23 are provided with only a circuit protection function and are constituted by transistors having large sizes to promote such circuit protection function. Therefore, the transistors having only the single circuit protection function occupy a large space and therefore, downsizing is difficult. Further, a space utilization efficiency becomes poor during manufacture of the integrated circuit.

Further, when a motor having a large torque is used as the motor 26, a function of supplying a large drive current is requested for the transistors 21 through 25, and transistors having large sizes are needed in addition to the protecting transistors having the large sizes, thereby rendering downsizing difficult to achieve.

It is an object of the invention to provide a step motor drive circuit that is capable of supplying a large drive current to a step motor and is capable of being downsized.

Further, it is another object of the invention to provide an analog electronic timepiece that is capable of using a motor having a large drive current and is capable of being downsized.

SUMMARY OF THE INVENTION

According to the invention, in one embodiment there is provided a step motor drive circuit characterized in a step motor drive circuit comprising a first transistor pair comprising a first and a second transistor, a second transistor pair comprising a third and a fourth transistor, and driving means for rotating a step motor in a predetermined direction by supplying an alternating signal to the step motor by alternately driving the first transistor pair and the second transistor pair to an ON state in driving to rotate the motor and driving both drive terminals of the step motor to a same level by driving the first and the third transistors to an ON state and driving the second and the fourth transistors to an OFF state in braking the motor, the step motor drive circuit further comprises a fifth transistor connected in parallel with the first transistor and a sixth transistor connected in parallel with the third transistor, wherein the driving means drives the fifth transistor to an ON state when the first transistor is driven to the ON state in driving to rotate the motor, drives the fifth transistor to an OFF state when the first transistor is driven to the ON state in braking the motor, drives the sixth transistor to an ON state when the third transistor is driven in the ON state in driving to rotate the motor and drives the sixth transistor to an OFF state when the third transistor is driven to the ON state in braking the motor.

The driving means drives the fifth transistor to the ON state when the first transistor is driven to the ON state in driving to rotate the motor, drives the fifth transistor to the OFF state when the first transistor is driven to the ON state in braking the motor, drives the sixth transistor to the ON state when the third transistor is driven to the ON state in driving to rotate the motor and drives the sixth transistor to the OFF state when the third transistor is driven to the ON state in braking the motor.

Here, there may be constructed a constitution (embodiment) in which the first and the fifth transistors are constituted by transistors of a same channel and the third and the sixth transistors are constituted by transistors of a same channel.

Further, there may be constructed a constitution (embodiment) in which the first and the fifth transistors are constituted by transistors of different channels and the third and the sixth transistors are constituted by transistors of different channels.

Further, there may be constructed a constitution (embodiment) in which the first through the sixth transistors are constituted by a semiconductor integrated circuit, the first and the fifth transistors are constituted by physically dividing a single one of a transistor and the third and the sixth transistors are constituted by physically dividing a single one of a transistor.

Further, there may be constructed a constitution (embodiment) in which an area of the fifth transistor is larger than an area of the first transistor and an area of the sixth transistor is larger than an area of the third transistor.

Further, according to the invention, there is provided an analog electronic timepiece characterized in an analog electronic timepiece comprising a step motor for driving to rotate a time hand and a step motor drive circuit operated to count time based on a time signal constituting a reference of time for driving to rotate the step motor and indicating time by the time hand by driving to rotate the motor by the step motor drive circuit, wherein the step motor drive circuit is constituted by using the step motor drive circuit according to any one of the foregoing embodiments.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
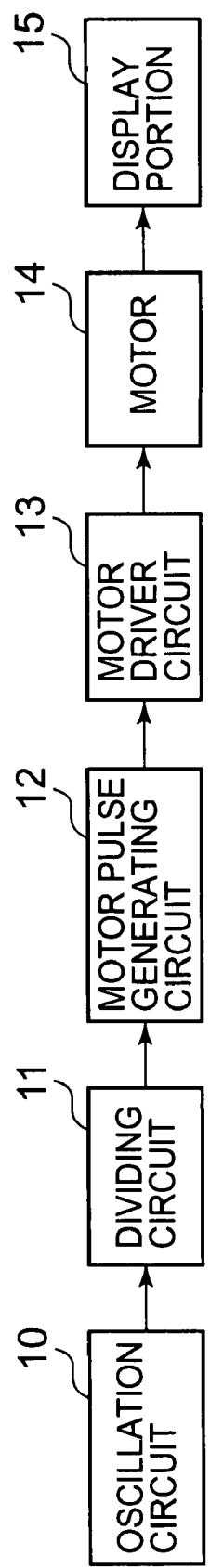
FIG. 1 is a block diagram of an analog electronic timepiece according to embodiments of the invention.

FIG. 1 is a block diagram of an analog electronic timepiece according to embodiments of the invention and is a block diagram common to respective embodiments described later.

In FIG. 1, an electronic timepiece includes an oscillation circuit 10 for generating a signal of a predetermined frequency, a dividing circuit 11 for generating a timepiece signal constituting a reference of time counting by dividing a signal generated by the oscillation circuit 10, a motor pulse generating circuit 12 for generating a drive pulse for driving a step motor 14 of the timepiece based on the timepiece signal, a motor driver circuit 13 for driving to rotate the step motor 14 in response to a signal from the motor pulse generating circuit 12, the step motor 14, and a display portion 15 having a train wheel and an indicating hand for displaying time or the like.

The oscillation circuit 10, the dividing circuit 11, the motor pulse generating circuit 12 and the motor driver circuit 13 constitute a step motor drive circuit. Further, the oscillation circuit 10, the dividing circuit 11 and the motor pulse generating circuit 12 constitute driving means.

Figure 2:
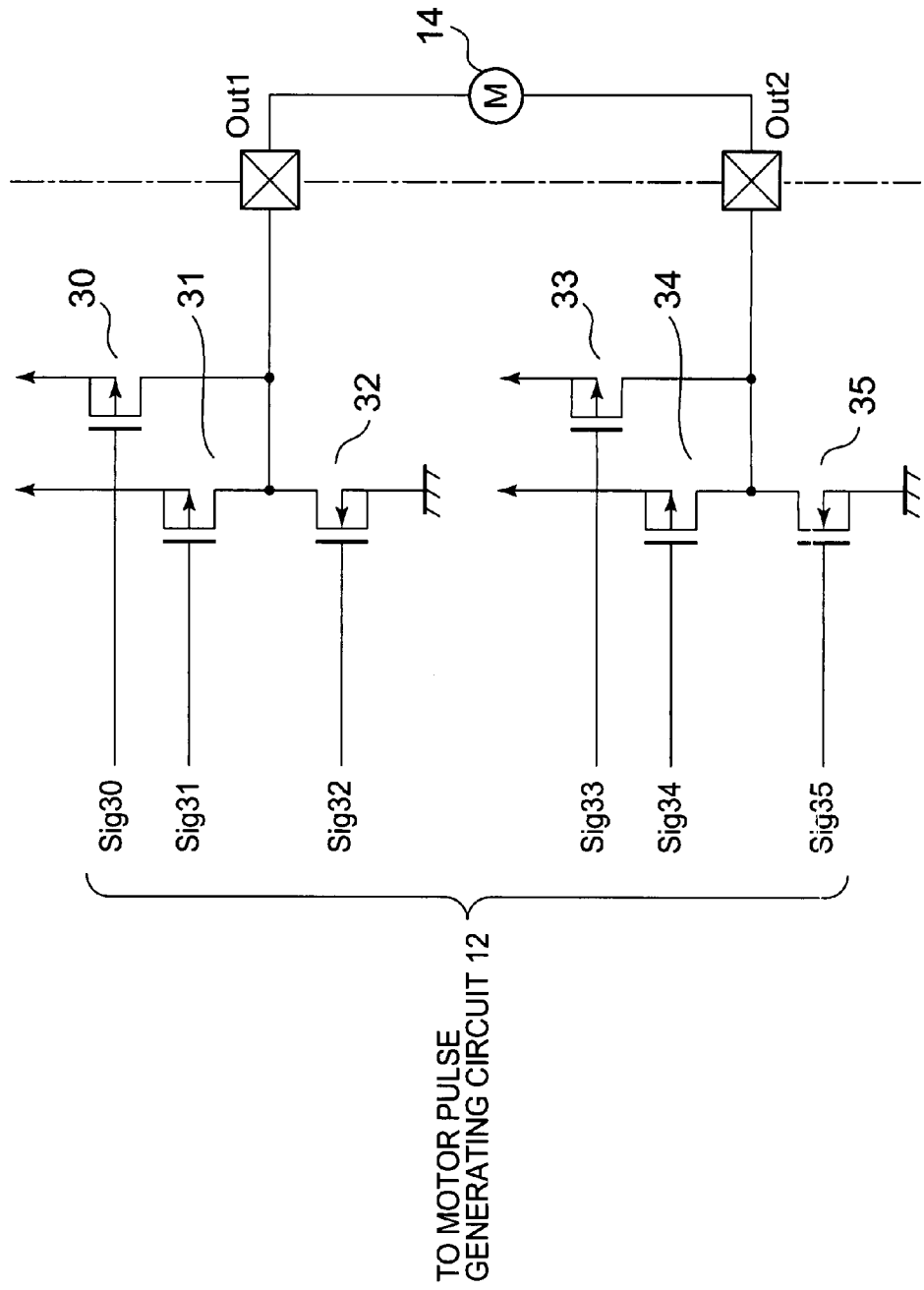
FIG. 2 is a circuit diagram of a step motor drive circuit used in an analog electronic timepiece according to the first embodiment of the invention.

FIG. 2 is a circuit diagram of the step motor drive circuit used for the analog electronic timepiece according to a first embodiment of the invention and is a detailed circuit diagram of the motor driver circuit 13.

In FIG. 2, the motor driver circuit 13 includes a first transistor pair comprising a P-channel field effect transistor (FET) (first transistor) 31 and an N-channel field effect transistor (second transistor) 35, a second transistor pair comprising a P-channel field effect transistor (third transistor) 34 and an N-channel field effect transistor (fourth transistor) 32, a P-channel field effect transistor (fifth transistor) 30 connected in parallel with the transistor 31, and a P-channel field effect transistor (sixth transistor) 33 connected in parallel with the transistor 34.

The step motor drive circuit is constituted by an integrated circuit (IC), and a connection point of the transistors 31, 32 and a connection point of the transistors 34, 35 constitute output terminals Out1, Out2 of the integrated circuit and are connected with drive terminals of the step motor 14 for the electronic timepiece.

According to the embodiment, the transistors 31, 3C are constituted by transistors of the same channel and also the transistors 34, 33 are constituted by transistors of the same channel.

The respective transistors 30 through 35 are supplied with drive signals Sig30 through Sig35 from the motor pulse generating circuit 12.

Figure 3:
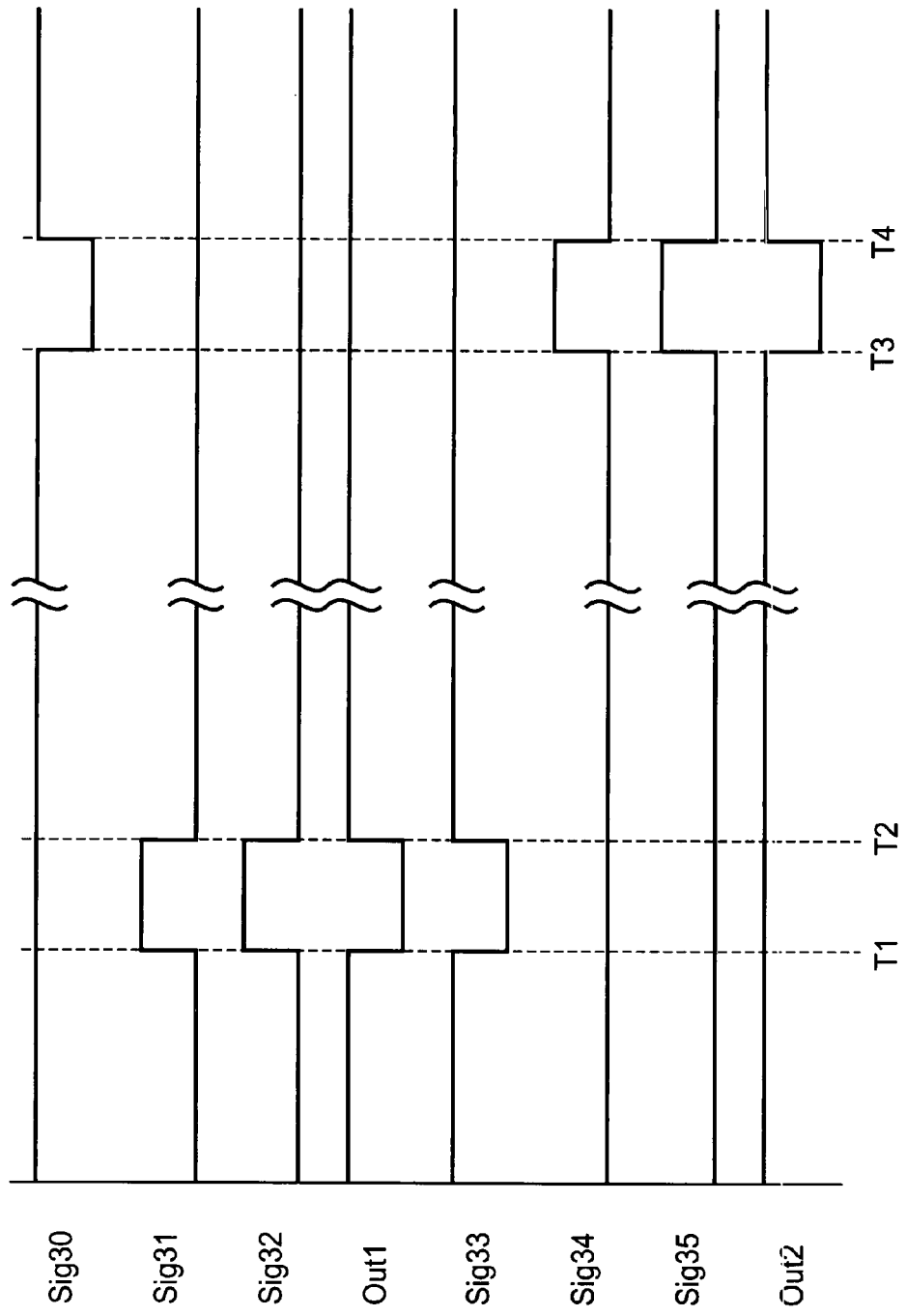
FIG. 3 is a timing chart of the step motor drive circuit used in the analog electronic timepiece according to the first embodiment of the invention.

FIG. 3 is a timing chart of the step motor drive circuit shown in FIG. 2. Subscripts 30 through 35 of the respective drive signals Sig designate notations of the transistors 30 through 35 inputted with the respective drive signals Sig.

A detailed explanation will be given of operation of the first embodiment in reference to FIG. 1 through FIG. 3 as follows.

In FIG. 1, the oscillation circuit 10 generates the signal of the predetermined frequency. The dividing circuit 11 generates the timepiece signal constituting the reference of time counting by dividing the signal generated by the oscillation circuit 10. The motor pulse generating circuit 12 generates the drive signal for driving the step motor 14 for the timepiece based on the timepiece signal. The motor driver circuit 13 drives to rotate the step motor 14 in response to the drive signal from the motor pulse generating circuit 12. The step motor 14 drives to rotate the display portion 15 by being driven by the motor driver circuit 13. The display portion 15 displays time or the like by rotating the indicating hand in response to driving the step motor 14.

Next, the operation of the motor driver circuit 13 will be explained in details in reference to FIG. 2 and FIG. 3.

First, in driving to rotate the motor for driving to rotate the step motor 14, at a first drive cycle at time T1 through T2 as shown by FIG. 3, the motor pulse generating circuit 12 supplies the drive signals Sig30, Sig31, Sig32 at high level to the transistors 30, 31, 32 and supplies the drive signals Sig33, Sig34, Sig35 at low level to the transistors 33, 34, 35.

Thereby, the transistors 32, 33, 34 are driven to an ON state and the transistors 30, 31, 35 are driven to an OFF state. Therefore, the output terminal Out1 becomes low level, the output terminal Out2 becomes high level, a drive current flows from the output terminal Out2 in a direction of the output terminal Out1 and the step motor 14 is rotated by a predetermined angle in a predetermined direction.

Next, in braking the motor for forcibly holding the step motor 14 at a predetermined rotational position (time T2 through T3), the transistors 30, 33 are supplied with the drive signals Sig30, Sig33 at high level, further, the transistors 31, 32, 34, 35 are supplied with the drive signals Sig31, Sig32, Sig34, Sig35 at low level. Thereby, the transistors 31, 34 are driven to the ON state. Therefore, both of the drive terminals of the step motor 14 connected to the output terminals Out1, Out2 become high level of the same level, the step motor 14 is braked.

At this occasion, the transistors 30, 33 are brought into the OFF state to function as protecting transistors. Further, even when a leakage current flows to the transistor 32, the leakage current only flows to the transistor 32 by way of the transistor 31, a leakage current does not flow thereto by way of the transistor 30 and therefore, also the leakage current flowing to the transistor 32 can be reduced. Further, similarly, also a leakage current flowing to the transistor 35 is constituted by a leakage current by way of the transistor 34 and therefore, also a leakage current flowing to the transistor 35 can be restrained to be small.

Next, in driving to rotate the motor of time T3 through T4 (second drive cycle), the motor pulse generating circuit 12 supplies the drive signals Sig33, Sig34, Sig35 at high level to the transistors 33, 34, 35, and supplies the drive signals Sig30, Sig31, Sig32 at low level to the transistors 30, 31, 32.

Thereby, the transistors 30, 31, 35 are driven to the ON state, the transistors 32, 33, 34 are driven to the OFF state. Therefore, the output terminal Out1 becomes high level, the output terminal Out2 becomes low level, a drive current flows from the output terminal Out1 in a direction of the output terminal Out2 and the step motor 14 is rotated by the predetermined angle in the predetermined direction.

In braking the motor successively, similar to the above-described, the drive signals Sig30, Sig33 at high level are supplied to the transistors 30, 33, further, the drive signals Sig31, Sig32, Sig34, Sig35 at low level are supplied to the transistors 31, 32, 34, 35. Thereby, the transistors 31, 34 are driven to the ON state. Therefore, both of the output terminals Out1, Out2 become high level, the both drive terminals of the step motor 14 are driven to the same level to brake the motor. At this occasion, the transistors 30, 33 are brought into the OFF state to function as protecting transistors.

Thereby, the step motor 14 can be rotated in the predetermined direction and can be braked at an interval of times of driving to rotate the motor by successively repeating the first drive cycle, motor braking, the second drive cycle and motor braking.

As described above, the step motor drive circuit according to the first embodiment is characterized by including the transistor 30 connected in parallel with the transistor 31 and the transistor 33 connected in parallel with the transistor 34 in the step motor drive circuit comprising the motor driver circuit 13 including the first transistor pair comprising the transistor 31 and the transistor 35, the second transistor pair comprising the transistor 34 and the transistor 32, and the motor pulse generating circuit 12 for rotating the step motor 14 in the predetermined direction by supplying the alternating signal to the step motor 14 by driving the first transistor pair and the second transistor pair alternately in the ON state in driving to rotate the motor, and shortcircuiting the both terminals of the step motor 14 by driving the transistor 31 and the transistor 34 to the ON state and driving the transistor 35 and the transistor 32 to the OFF state in braking the motor, the motor pulse generating circuit 12 drives the transistor 30 to the ON state when the transistor 31 is driven to the ON state in driving to rotate the motor, drives the transistor 30 to the OFF state when the transistor 31 is driven to the ON state in braking the motor, drives the transistor 33 to the ON state when the transistor 34 is driven to the ON state in driving to rotate the motor and drives the transistor 33 to the OFF state when the transistor 34 is driven to the ON state in braking the motor.

That is, there is constructed a constitution in which in driving to rotate the motor 14, the first cycle of driving the transistors 30, 31, 35 to the ON state and driving the transistors 34, 33, 32 to the OFF state, and the second cycle of driving the transistors 34, 33, 32 to the ON state and driving the transistors 30, 31, 35 to the OFF state are alternately carried out, and at time of braking the motor 14 provided between times of (first and second cycles) driving to rotate the motor, the transistors 31, 34 are driven to the ON state, the transistors 30, 32, 33, 35 are driven to the OFF state.

Therefore, the transistors 30, 33 function as the transistors for driving the motor in driving the motor, further, function as the protecting transistors in braking the motor, a single one of the transistor can be provided with the plurality of functions by being used both for driving the motor and for electrostatic resistance. Further, in driving the motor, the transistors 30, 31 function integrally for driving the motor, further, the transistors 33, 34 function integrally for driving the motor and therefore, a large drive current can be supplied to the step motor 14, further, it is not necessary to use transistors exclusively for protection and therefore, there is achieved an effect of capable of achieving small-sized formation.

Further, when the transistors 30 through 35 are constituted by a semiconductor integrated circuit, the transistors 31, 30 can be constituted by physically dividing a single transistor, the transistors 34, 33 can be constituted by physically dividing a single transistor. Further, in this case, a protecting function can be promoted by forming an area of the transistor 30 larger than that of the transistor 31 and forming an area of the transistor 34 larger than that of the transistor 33.

Figure 4:
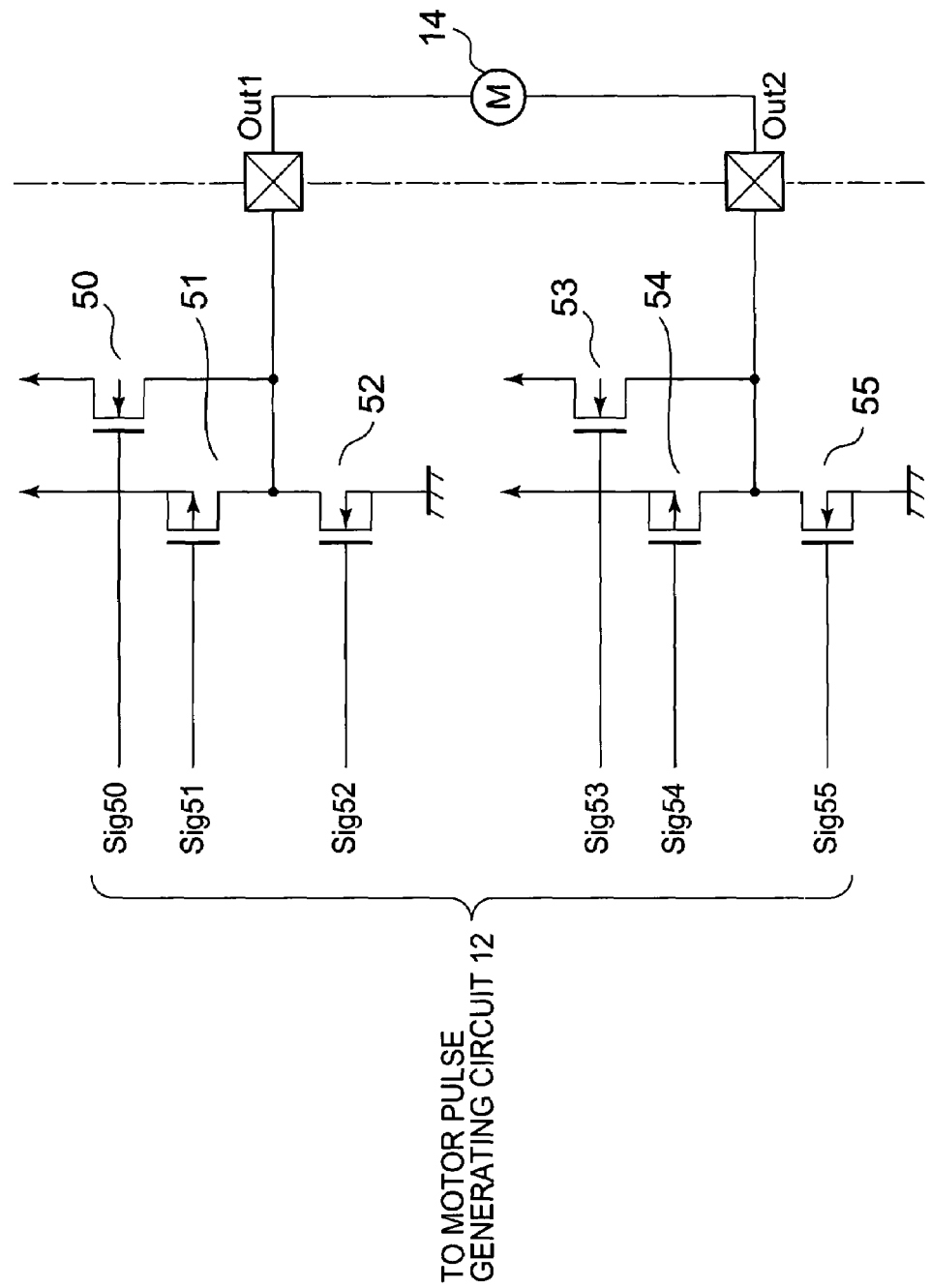
FIG. 4 is a circuit diagram of a step motor used in an analog electronic timepiece according to a second embodiment of the invention.

FIG. 4 is a circuit diagram of a step motor drive circuit used in an analog electronic timepiece according to a second embodiment of the invention and is a detailed circuit diagram of the motor driver circuit 13.

As a point of difference between the second embodiment and the first embodiment, the second embodiment and the first embodiment differ from each other in that although according to the first embodiment, the fifth transistor 30 and the sixth transistor 33 are constituted by the P-channel field effect transistors, according to the second embodiments, the fifth transistor and the sixth transistor are constituted by N-channel field effect transistors 50, 53.

That is, a P-channel field effect transistor (first transistor) 51 and the transistor 50 are constituted by transistors having different channels, further, a P-channel field effect transistor 54 (third transistor) and the transistor 53 are constituted by transistors having different channels. Further, an N-channel field effect transistor 52 constitutes the fourth transistor, and an N-channel field effect transistor 55 constitutes the second transistor.

The respective transistors 50 through 55 are supplied with drive signals Sig50 through Sig55 from the motor pulse generating circuit 12.

Figure 5:
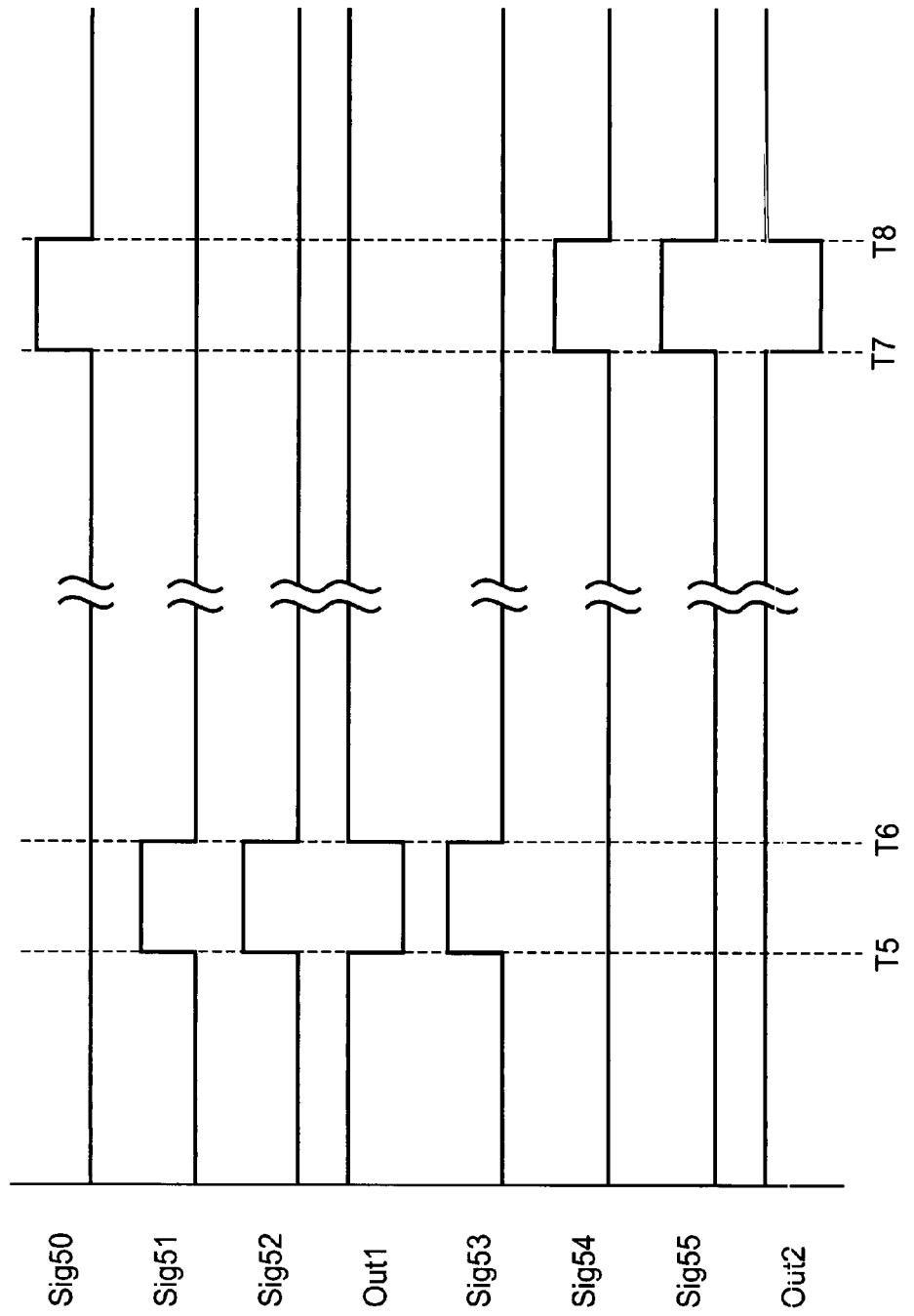
FIG. 5 is a timing chart of the step motor drive circuit used in the analog electronic timepiece according to the second embodiment of the invention.

FIG. 5 is a timing chart of the step motor drive circuit shown in FIG. 4.

A detailed explanation will be given of operations of portions different from those of the first embodiment and an explanation will be omitted for portions common to those of the first embodiment in reference to FIG. 1, FIG. 4, FIG. 5 as follows.

First, in driving to rotate the motor for driving to rotate the step motor 14, at a first drive cycle of time T5 through T6 shown in FIG. 5, the motor pulse generating circuit 12 supplies drive signals Sig51, Sig52, Sig53 at high level to the transistors 51, 52, 53, further, supplies the drive signals Sig50, Sig54, Sig55 at low level to the transistors 50, 54, 55.

Thereby, the transistors 52, 53, 54 are driven to the ON state, the transistors 50, 51, 55 are driven to the OFF state. Therefore, the output terminal Out1 becomes low level, the output terminal Out2 becomes high level, a drive current flows from the output terminal Out2 in a direction of the output terminal Out1, and the step motor 14 is rotated by a predetermined angle in a predetermined direction.

Next, in braking the motor (time T6 through T7) for forcibly holding the step motor 14 at a predetermined rotational position, the drive signals Sig50 through Sig55 all at low level are supplied to the transistors 50 through 55. Thereby, the transistors 51, 54 are driven to the ON state. Therefore, both of the output terminals Out1, Out2 become high level and both of the drive terminals of the step motor 14 are driven to the same level to brake the motor.

At this occasion, the transistors 50, 53 are brought into the OFF state to function as protecting transistors. Further, even when a leakage current flows in the transistor 52, only a leakage current flows to the transistor 52 by way of the transistor 51, the leakage current does not flows thereto by way of the transistor 50 and therefore, the leakage current flowing to the transistor 52 can be reduced. Further, similarly, also a leakage current flowing to the transistor 55, only a leakage current flows thereto by way of the transistor 54 and therefore, also the leakage current flowing to the transistor 55 can be restrained to be small.

Next, in driving to rotate the motor at time T7 through T8 (second drive cycle), the motor pulse generating circuit 12 supplies the drive signals Sig50, Sig54, Sig55 at high Level to the transistors 50, 54, 55, further, supplies the drive signals Sig51, Sig52, Sig53 at low level to the transistors 51, 52, 53.

Thereby, the transistors 50, 51, 55 are driven to the ON state, the transistors 52, 53, 54 are driven to the OFF state. Therefore, the output terminal Out1 becomes high level, the output terminal Out2 becomes low level, a drive current flows from the output terminal Out1 in a direction of the output terminal Out2 to rotate the step motor 14 by the predetermined angle in the predetermined direction.

In braking the motor successively, similar to the above-described, the drive signals Sig50 through Sig55 all at low level are supplied to the transistors 50 through 55. Thereby, the transistors 51, 54 are driven to the ON state. Therefore, both of the output terminals Out1, Out2 become high level, both of the drive terminals of the step motor 14 are driven to high level of the same level to brake the motor. At this occasion, the transistors 50, 53 are brought into the OFF state to function as protecting transistors.

In this way, the step motor 14 can be rotated in the predetermined direction and can be braked at an interval of times of driving to rotate the motor by successively repeating the first drive cycle, motor braking, the second drive cycle and motor braking.

Therefore, similar to the first embodiment, the transistors 50, 53 function as transistors for driving the motor in driving the motor, further, function as protecting transistors in braking the motor, and a single transistor can be provided with a plurality of functions. Further, in driving the motor, the transistors 50, 51 integrally function for driving the motor, further, the transistors 53, 54 integrally function for driving the motor and therefore, a large drive current can be supplied to the step motor 14, further, it is not necessary to use a transistor exclusively for protection and therefore, an effect of capable of being downsized can be achieved.

Further, the protecting function can be promoted by forming an area of the transistor 50 larger than that of the transistor 51 and forming an area of the transistor 54 larger than that of the transistor 53.

Figure 6:
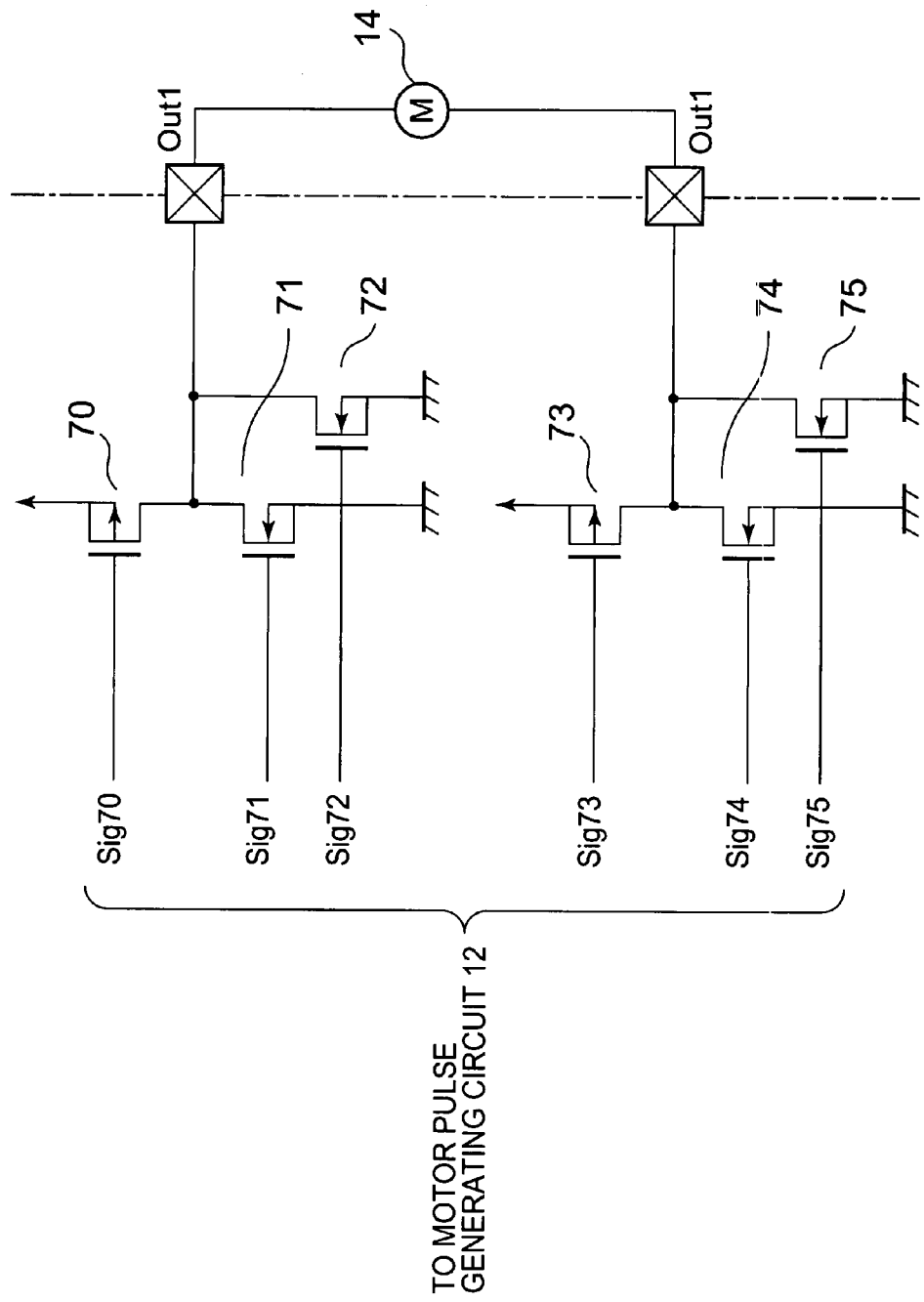
FIG. 6 is a circuit diagram of the step motor used in an analog electronic timepiece according to a third embodiment of the invention.

FIG. 6 is a circuit diagram of a step motor drive circuit used in an analog electronic timepiece according to a third embodiment of the invention and is a detailed circuit diagram of the motor driver circuit 13.

As a point of difference between the third embodiment and the second embodiment, the difference resides in that although according to the second embodiment, the transistor 50 and the transistor 53 are constituted to be respectively connected in parallel with the transistor 51 and the transistor 54, according to the third embodiment, a transistor 72 and a transistor 75 are constituted to be respectively connected in parallel with a transistor 71 and a transistor 74.

Drive signals Sig70 through Sig75 are supplied from the motor pulse generating circuit 12 to respective transistors 70 through 75.

Further, the N-channel field effect transistor 71 constitutes a first transistor, the P-channel field effect transistor 73 constitutes a second transistor, the N-channel field effect transistor 74 constitutes a third transistor, the P-channel field effect transistor 70 constitutes a fourth transistor, the N-channel field effect transistor 72 constitutes a fifth transistor, the N-channel field effect transistor 75 constitutes a sixth transistor.

Figure 7:
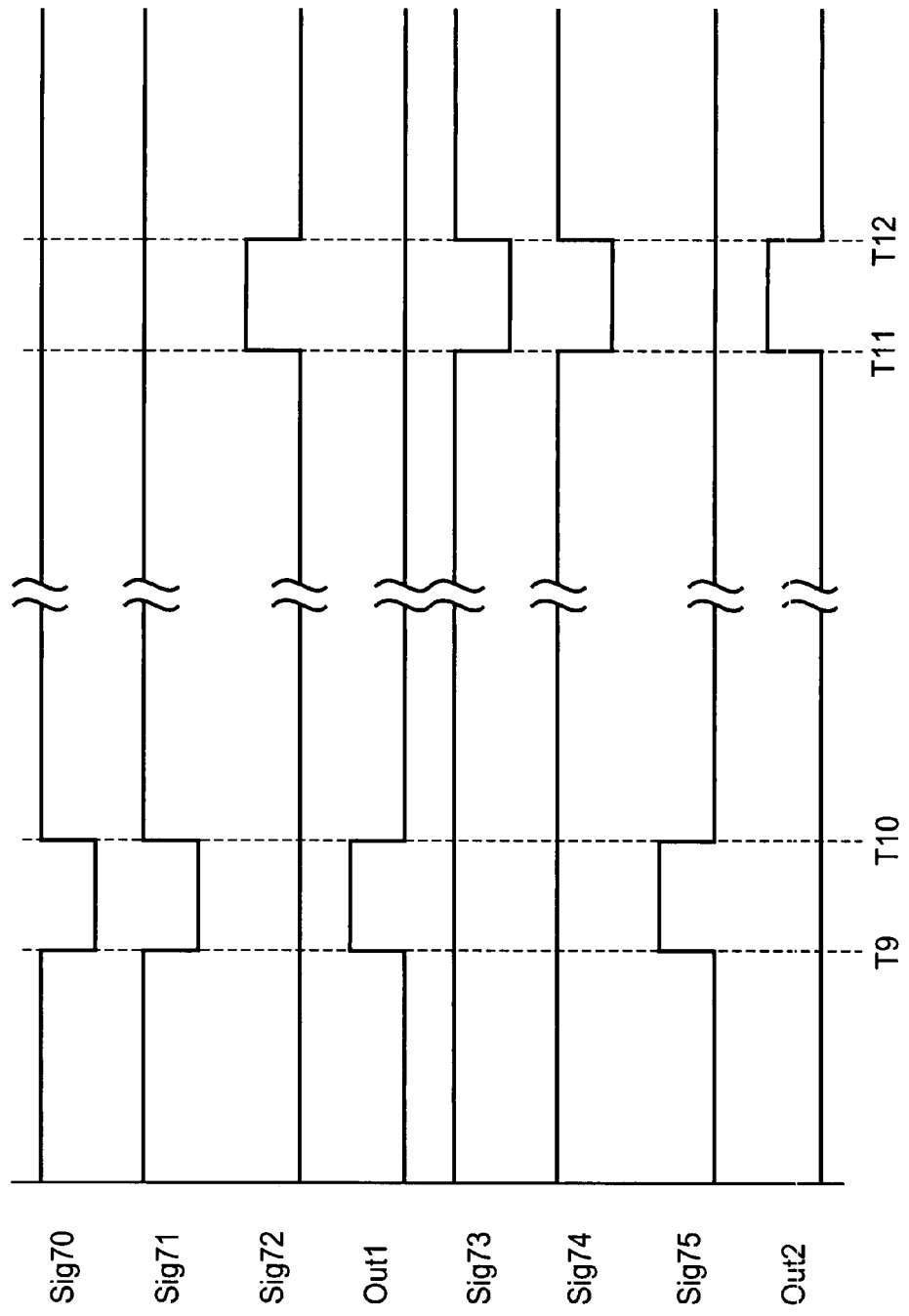
FIG. 7 is a timing chart of the step motor drive circuit used in the analog electronic timepiece according to the third embodiment of the invention.

FIG. 7 is a timing chart of the step motor drive circuit shown in FIG. 6.

A detailed explanation will be given of operation of a portion which differs from that of the second embodiment and an explanation will be omitted of a common portion in reference to FIG. 1, FIG. 6, FIG. 7 as follows.

First, in driving to rotate the motor for driving to rotate the step motor 14, at a first drive cycle of time T9 through time T10 as shown by FIG. 7, the motor pulse generating circuit 12 supplies drive signals Sig73 through Sig75 at high level to the transistors 73 through 75 and supplies drive signals Sig70 through Sig72 at low level to the transistors 70 through 72.

Thereby, the transistors 70, 74, 75 are driven to the ON state, the transistors 71, 72, 73 are driven to the OFF state. Therefore, the output terminal Out1 becomes high level, the output terminal Out2 becomes low level, a drive current flows from the output terminal Out1 in a direction of the output terminal Out2 and the step motor 14 is rotated by a predetermined angle in a predetermined direction.

Next, in braking the motor for forcibly holding the step motor 14 at a predetermined rotational position (time T10 through T11), the drive signals Sig70, Sig71, Sig73, Sig74 at high level are supplied to the transistors 70, 71, 73, 74 and the drive signals Sig72, Sig75 at low level are supplied to the transistors 72, 75. Thereby, the transistors 71, 74 are driven to the ON state. Therefore, both of the output terminals Out1, Out2 become low level, and the both drive terminals of the step motor 14 are driven to the same low level to brake the motor.

At this occasion, the transistors 72, 75 are brought into the OFF state to function as protecting transistors. Further, even when a leak current flows to the transistor 71, only a leak current flows to the transistor 70 by way of the transistor 71, and the leakage current does not flows thereto by way of the transistor 72 and therefore, the leakage current flowing to the transistor 70 can be reduced. Further, similarly, also as a leakage current flowing to the transistor 73, only a leakage current flows thereto by way of the transistor 74 and therefore, the leakage current flowing in the transistor 73 can be restrained to be small.

Next, in driving to rotate the motor at time T11 through T12 (second drive cycle), the motor pulse generating circuit 12 supplies the drive signals Sig70 through Sig72 at high level to the transistors 70 through 72 and supplies the drive signals Sig73 through Sig75 at low level to the transistors 73 through 75.

Thereby, the transistors 71, 72, 73 are driven to the ON state, the transistors 70, 74, 75 are driven to the OFF state. Therefore, the output terminal Out1 becomes low level, the output terminal Out2 becomes high level, a drive current flows to the output terminal Out2 in direction of the output terminal Out1 and the step motor 14 is rotated by the predetermined angle in the predetermined direction.

In braking the motor successively, similar to the above-described, the drive signals Sig70, Sig71, Sig73, Sig74 at high level are supplied to the transistors 70, 71, 73, 74, and the drive signals Sig72, Sig75 at low level are supplied to the transistors 72, 75. Thereby, the transistors 71, 74 are driven to the ON state. Therefore, both of the output terminals Out1, Out2 become low level, and both drive terminals of the step motor 14 are driven to low level of the same level to brake the motor. At this occasion, the transistors 72, 75 are brought into the OFF state to function as protecting transistors.

In this way, the step motor 14 can be rotated in the predetermined direction and can be braked at an interval between times of driving to rotate the motor by successively repeating the first drive cycle, motor braking, the second drive cycle and motor braking.

Therefore, similar to the second embodiment, single ones of the transistors 72, 75 can be provided with a plurality of functions. Further, in driving the motor, the transistors 72, 75 function for driving the motor and therefore, a large drive current can be supplied to the step motor 14, further, it is hot necessary to use a transistor exclusive for protection and therefore, an effect of capable of being downsized is achieved.

Further, when the transistors 70 through 75 are constituted by a semiconductor integrated circuit, the transistors 71, 72 can be constituted by physically dividing a single one of a transistor and the transistors 74, 75 can be constituted by physically dividing a single one of a transistor. Further, in this case, a protecting function can be promoted by forming an area of the transistor 72 larger than that of transistor 71 and forming an area of the transistor 75 larger than that of the transistor 74.

Figure 8:
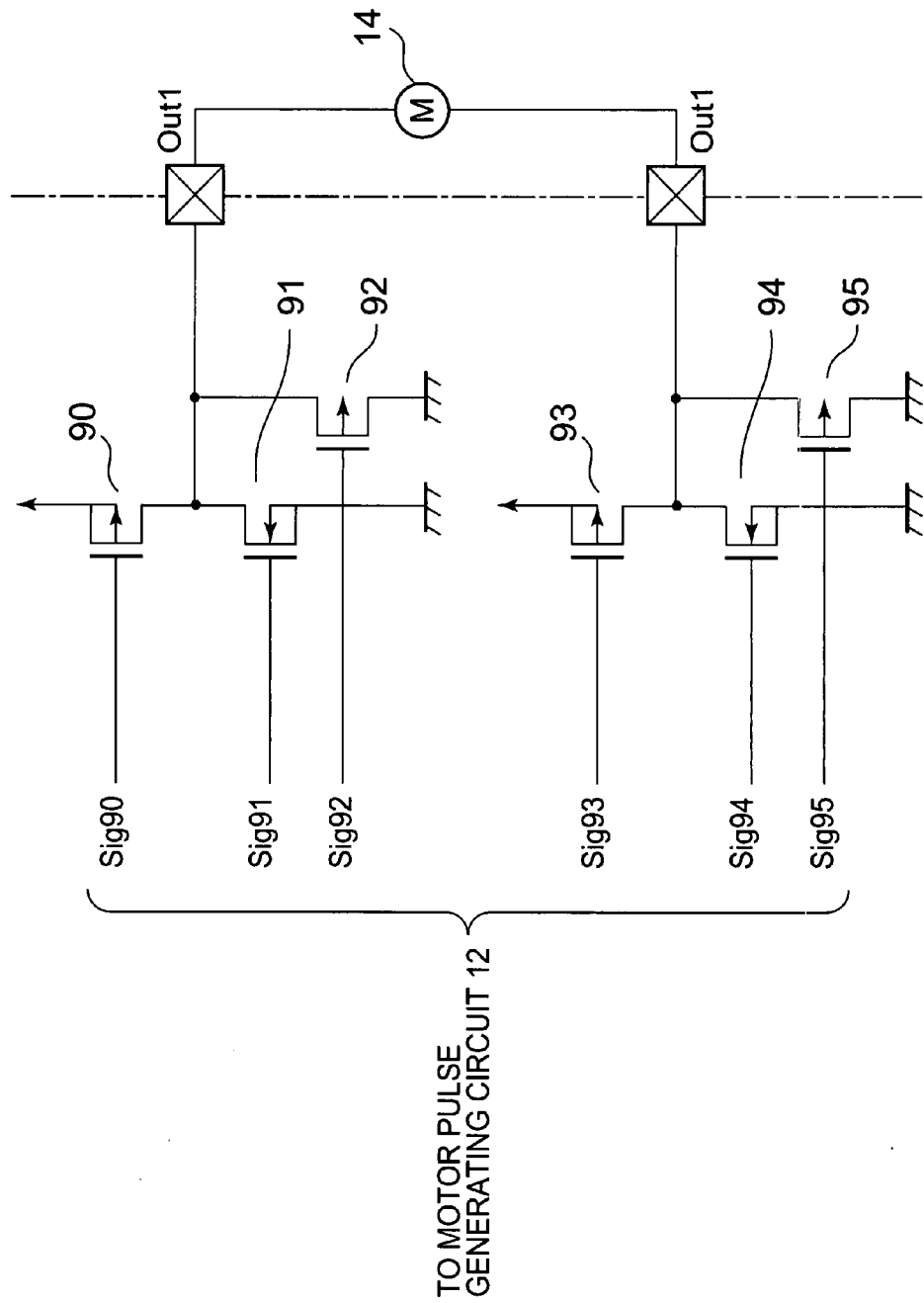
FIG. 8 is a circuit diagram of a step motor drive circuit used in an analog electronic timepiece according to a fourth embodiment of the invention.

FIG. 8 is a circuit diagram of a step motor drive circuit used in an analog electronic timepiece according to a fourth embodiment of the invention and is a detailed circuit diagram of the motor driver circuit 13.

As a point of difference between the fourth embodiment and the third embodiment, the difference resides in that although according to the third embodiment, the transistors 72, 75 are constituted to be respectively connected in parallel with the transistors 71, 74 having the same channel, according to the fourth embodiment, transistors 92, 95 are constituted to be respectively connected in parallel with transistors 91, 94 having a different channel.

Drive signals Sig90 through Sig95 are supplied from the motor pulse generating circuit 12 to respective transistors 90 through 95.

Further, the N-channel field effect transistor 91 constitutes a first transistor, a P-channel field effect transistor 93 constitutes a second transistor, the N-channel field effect transistor 94 constitutes a third transistor, the P-channel field effect transistor 90 constitutes a fourth transistor, the P-channel field effect transistor 92 constitutes a fifth transistor, the P-channel field effect transistor 95 constitutes a sixth transistor.

Figure 9:
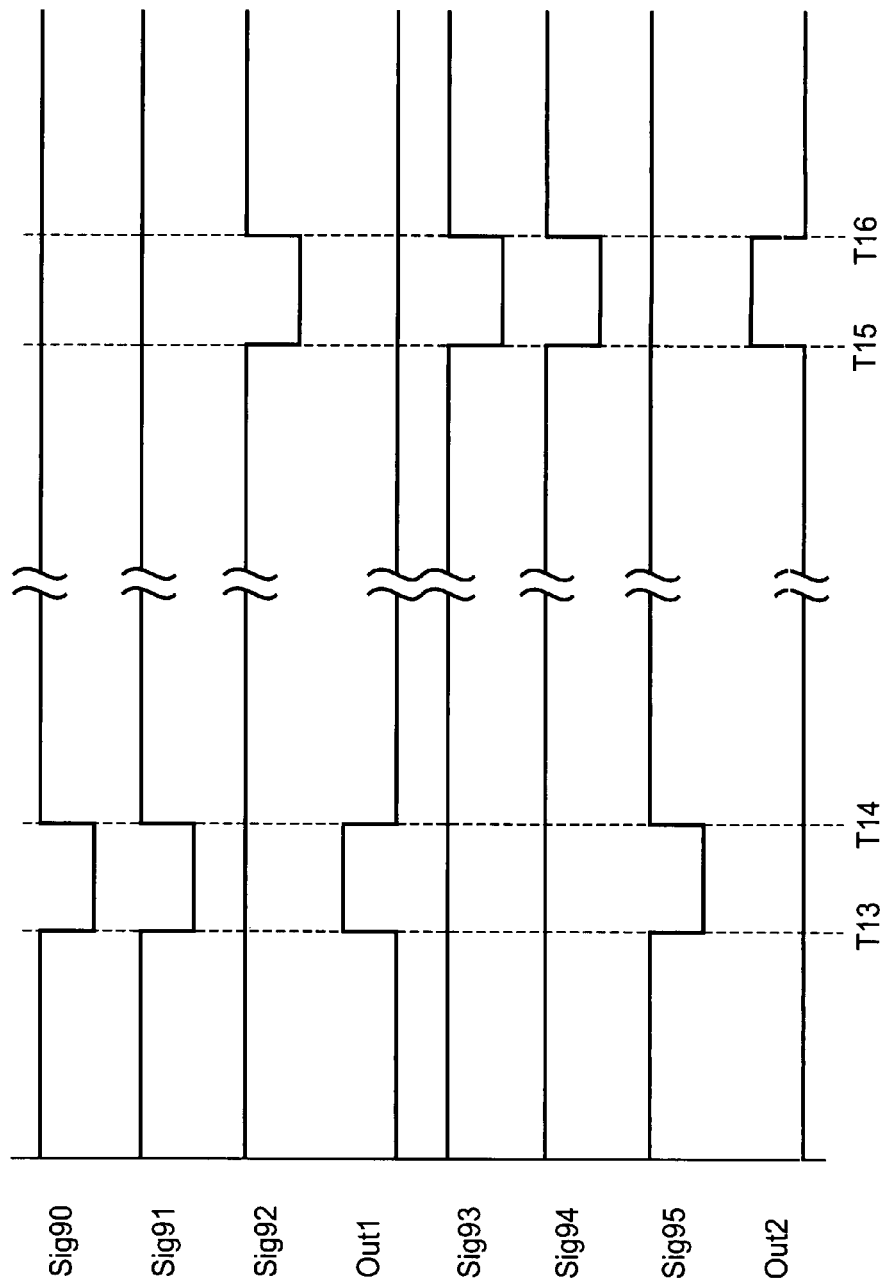
FIG. 9 is a timing chart of the step motor drive circuit used in an analog electronic timepiece according to the fourth embodiment of the invention.
Figure 10:
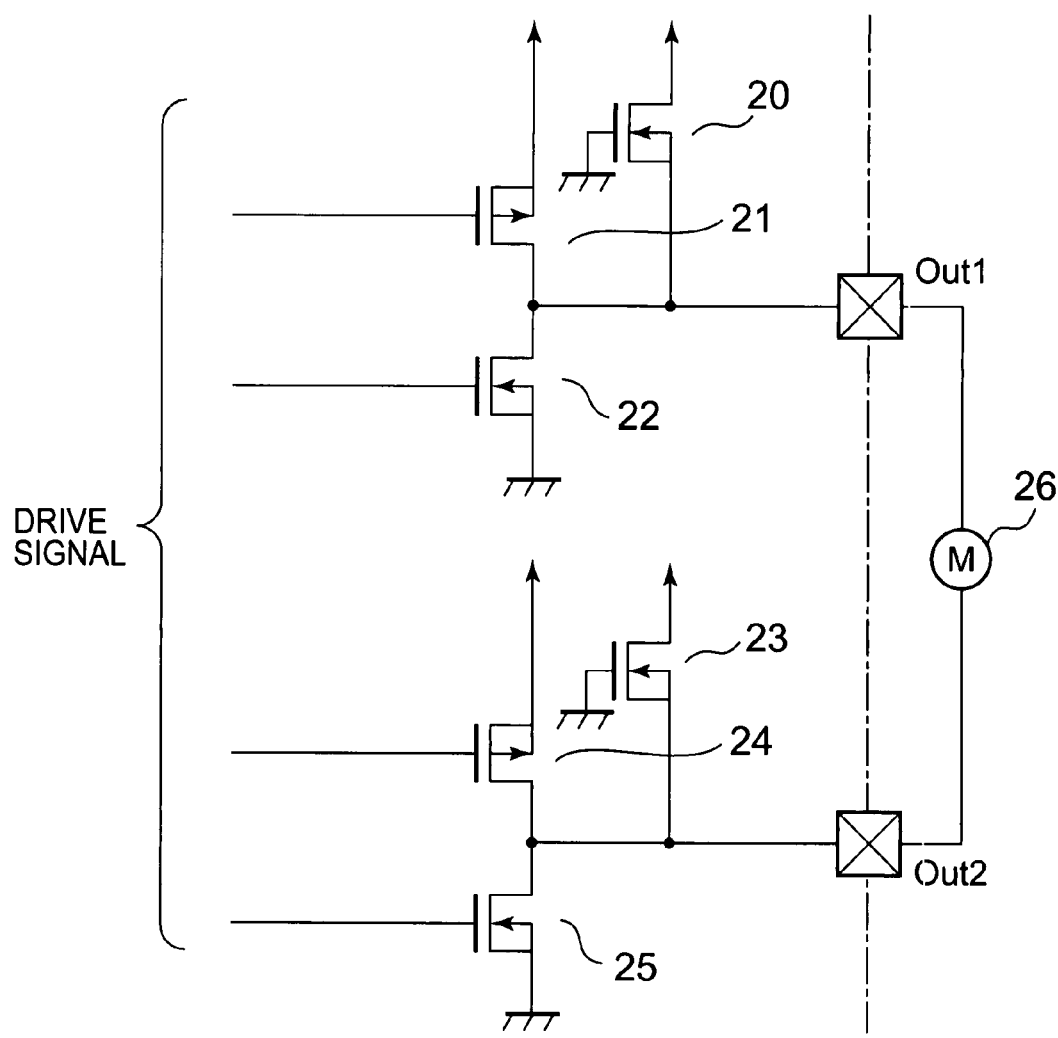
FIG. 10 is a circuit diagram of a step motor drive circuit used in an analog electronic timepiece of a background art.

FIG. 9 is a timing chart of the step motor drive circuit shown in FIG. 8.

A detailed explanation will be given of an operation of a portion which differs from that of the third embodiment and an explanation will be omitted for common portion in reference to FIG. 1, FIG. 8, FIG. 9 as follows.

First, in driving to rotate the motor for driving to rotate the step motor 14, at a first drive cycle of time T13 through time T14 as shown by FIG. 9, the motor pulse generating circuit 12 supplies drive signals Sig92 through Sig94 at high level to the transistors 92 through 94 and supplies drive signals Sig90, Sig91, Sig95 at low level to the transistors 90, 91, 95.

Thereby, the transistors 90, 94, 95 are driven to the ON state, the transistors 91 through 93 are driven to the OFF state. Therefore, the output terminal Out1 becomes high level, the output terminal Out2 becomes low level. A drive current flows from the output terminal Out1 in a direction of the output terminal Out2 and the step motor 14 is rotated by a predetermined angle in a predetermined direction.

Next, in braking the motor for forcibly holding the step motor 14 at a predetermined rotational position (time T14 through T15), the drive signals Sig90 through Sig95 at high level are supplied to all of the transistors 90 through 95. Thereby, the transistors 91, 94 are driven to the ON state. Therefore, both of the output terminals Out1, Out2 become low level and the both drive terminals of the step motor 14 are driven to low level to brake the motor.

At this occasion, the transistors 92, 95 are brought into the OFF state to function as protecting transistors. Further, even when a leakage current flows to the transistor 91, only a leakage current flows to the transistor 90 by way of the transistor 91, the leakage current does not flow thereto by way of the transistor 92 and therefore, the leakage current flowing to the transistor 90 can be reduced. Further, also as a leakage current flowing in the transistor 93, only a leakage current flows thereto by way of the transistor 94 and therefore, also the leakage current flowing to the transistor 93 can be restrained to be small.

Next, in driving to rotate the motor at time T15 through T16 (second drive cycle), the motor pulse generating circuit 12 supplies the drive signals Sig90, Sig91, Sig95 at high Level to the transistors 90, 91, 95 and supplies the drive signals Sig92 through Sig94 at low level to the transistors 92 through 94.

Thereby, the transistors 91 through 93 are driven to the ON state and the transistors 90, 94, 95 are driven to the OFF state. Therefore, the output terminal Out1 becomes low level, the output terminal Out2 becomes high level, a drive current flows from the output terminal Out2 in a direction of the output terminal Out1 and the step motor 14 is rotated by the predetermined angle in the predetermined direction.

In braking the motor successively, similar to the above-described, the drive signals Sig90 through Sig95 all at high level are supplied to the transistors 90 through 95. Thereby, the transistors 91, 94 are driven to the ON state. Therefore, both of the output terminals Out1, Out2 become low level, the both drive terminals of the step motor 14 become low level of the same level to brake the motor. At this occasion, the transistors 92, 95 are brought into the OFF state to function as protecting transistors.

In this way, the step motor 14 can be rotated in the predetermined direction and can be braked at an interval between times of driving to rotate the motor by successively repeating the first drive cycle, motor braking, the second drive cycle and motor braking.

Therefore, similar to the third embodiment, single ones of the transistors 92, 95 can be provided with a plurality of functions. Further, in driving the motor, the transistors 92, 95 function for driving the motor and therefore, a large drive current can be supplied to the step motor 14, further, it is not necessary to use a transistor exclusive for protection and therefore, an effect of capable of being downsized or the like can be achieved.

Further, according to the analog electronic timepieces according to the respective embodiments, the step motor 14 having a large drive current can be used and an effect of capable of being downsized is achieved.

According to the step motor drive circuit of the invention, single ones of transistors can be used both for driving the step motor and for protection, the large current can be supplied to the motor and the motor can be downsized.

Further, according to the analog electronic circuit of the invention, the motor having the large drive current: can be used and the motor can be downsized.

The step motor drive circuit of the invention is applicable to drive circuits of various step motors starting from the drive circuits of the step motors for driving a time hand or a calendar in the analog electronic timepieces.

Further, the analog electronic timepiece of the invention is applicable to various analog electronic timepieces of an analog electronic wristwatch and an analog electronic clock, an analog electronic timepiece attached with a calendar function and the like, and particularly suitable for an analog electronic timepiece constituting a power source by a battery.

What is claimed is:

1. A step motor drive circuit comprising:
   a first transistor pair comprised of a first transistor and a second transistor;
   a second transistor pair comprised of a third transistor and a fourth transistor;
   a fifth transistor connected in parallel with the first transistor;
   a sixth transistor connected in parallel with the third transistor;
   output terminals for connection to respective drive terminals of a step motor to supply signals to the step motor in a state of rotating the step motor and in a state of braking the step motor; and
   driving means for rotating the step motor in a predetermined direction by supplying an alternating signal to the step motor by alternately driving the first transistor pair and the second transistor pair to an ON state in a state of rotating the step motor and driving the drive terminals of the step motor to a same level by driving the first and the third transistors to an ON state and driving the second and the fourth transistors to an OFF state in the state of braking the step motor;
   wherein the driving means drives the fifth transistor to an ON state when the first transistor is driven to the ON state in the state of rotating the step motor, drives the fifth transistor to an OFF state when the first transistor is driven to the ON state in the state of braking the step motor, drives the sixth transistor to an ON state when the third transistor is driven to the ON state in the state of rotating the step motor, and drives the sixth transistor to an OFF state when the third transistor is driven to an ON state in the state of braking the step motor; and
   wherein when driven to the OFF state in the state of braking the step motor, the fifth transistor and the sixth transistor function as protecting transistors that protect the first, second, third and fourth transistors from static electricity generated during operation of the step motor drive circuit.

2. A step motor drive circuit according to claim 1; wherein the first and the fifth transistors are transistors of a same channel type and the third and the sixth transistors are transistors of a same channel type.

3. An analog electronic timepiece comprising:
   a time hand for indicating time;
   a step motor for rotating the time hand to indicate time; and
   a step motor drive circuit according to claim 2 for driving the step motor to rotate the time hand to indicate time.

4. A step motor drive circuit according to claim 1; wherein the first and the fifth transistors are transistors of different channel types and the third and the sixth transistors are by transistors of different channel types.

5. An analog electronic timepiece comprising:
   a time hand for indicating time;
   a step motor for rotating the time hand to indicate time; and
   a step motor drive circuit according to claim 3 for driving the step motor to rotate the time hand to indicate time.

6. A step motor drive circuit according to claim 1; wherein the first through the sixth transistors form a semiconductor integrated circuit, the first and the fifth transistors are formed by physically dividing a single one of a transistor, and the third and the sixth transistors are formed by physically dividing a single one of a transistor.

7. An analog electronic timepiece comprising:
   a time hand for indicating time;
   a step motor for rotating the time hand to indicate time; and
   a step motor drive circuit according to claim 4 for driving the step motor to rotate the time hand to indicate time.

8. An analog electronic timepiece comprising:
   a time hand for indicating time;
   a step motor for rotating the time hand to indicate time; and
   a step motor drive circuit according to claim 1 for driving the step motor to rotate the time hand to indicate time.

9. A step motor drive circuit comprising:
   a first transistor pair comprised of a first transistor and a second transistor;
   a second transistor pair comprised of a third transistor and a fourth transistor;
   a fifth transistor connected in parallel with and having an area larger than the first transistor;
   a sixth transistor connected in parallel with and having an area larger than the third transistor;
   a pair of output terminals for connection to respective drive terminals of a step motor to supply signals to the step motor in a state of rotating the step motor and in a state of braking the step motor; and
   driving means for rotating the step motor in a predetermined direction by supplying an alternating signal to the step motor by alternately driving the first transistor pair and the second transistor pair to an ON state in a state of rotating the step motor and driving the drive terminals of the step motor to a same level by driving the first and the third transistors to an ON state and driving the second and the fourth transistors to an OFF state in the state of braking the step motor;
   wherein the driving means drives the fifth transistor to an ON state when the first transistor is driven to the ON state in the state of rotating the step motor, drives the fifth transistor to an OFF state when the first transistor is driven to the ON state in the state of braking the step motor, drives the sixth transistor to an ON state when the third transistor is driven to the ON state in the state of rotating the step motor, and drives the sixth transistor to an OFF state when the third transistor is driven to an ON state in the state of braking the step motor.

10. An analog electronic timepiece comprising:
    a time hand for indicating time;
    a step motor for rotating the time hand to indicate time; and
    a step motor drive circuit according to claim 5 for driving the step motor to rotate the time hand to indicate time.

11. A step motor drive circuit comprising:

a semiconductor integrated circuit comprised of a first transistor pair having a first transistor and a second transistor, a second transistor pair having a third transistor and a fourth transistor, a fifth transistor connected in parallel with the first transistor, a sixth transistor connected in parallel with the third transistor, and output terminals for connection to respective drive terminals of a step motor to supply signals to the step motor in a state of rotating the step motor and in a state of braking the step motor; and driving means for alternately driving the first transistor pair and the second transistor pair to an ON state in the state of rotating the step motor, shortcircuiting the drive terminals of the step motor by driving the first and the third transistors to an ON state and driving the second and the fourth transistors to an OFF state in the state of braking the step motor, driving the fifth transistor to an ON state when the first transistor is driven to the ON state in the state of rotating the step motor, driving the fifth transistor to an OFF state when the first transistor is driven to the ON state in the state of braking the step motor, driving the sixth transistor to an ON state when the third transistor is driven to the ON state in the state of rotating the step motor, and driving the sixth transistor to an OFF state when the third transistor is driven to an ON state in the state of braking the step motor, the fifth transistor and the sixth transistor functioning as protecting transistors that protect the first, second, third and fourth transistors by increasing the electrostatic resistance thereof.

12. An analog electronic timepiece comprising: a time hand for indicating time; a step motor for rotating the time hand to indicate time; and a step motor drive circuit according to claim 11 for driving the step motor to rotate the time hand to indicate time.

13. A step motor drive circuit according to claim 11; wherein the first and the fifth transistors are transistors of a same channel type and the third and the sixth transistors are transistors of a same channel type.

14. An analog electronic timepiece comprising: a time hand for indicating time; a step motor for rotating the time hand to indicate time; and a step motor drive circuit according to claim 13 for driving the step motor to rotate the time hand to indicate time.

15. A step motor drive circuit according to claim 11; wherein the first and the fifth transistors are transistors of different channel types and the third and the sixth transistors are transistors of different channel types.

16. An analog electronic timepiece comprising: a time hand for indicating time; a step motor for rotating the time hand to indicate time; and a step motor drive circuit according to claim 15 for driving the step motor to rotate the time hand to indicate time.

17. A step motor drive circuit according to claim 11; wherein the first through the sixth transistors form a semiconductor integrated circuit, the first and the fifth transistors are formed by physically dividing a single one of a transistor, and the third and the sixth transistors are formed by physically dividing a single one of a transistor.

18. An analog electronic timepiece comprising: a time hand for indicating time; a step motor for rotating the time hand to indicate time; and a step motor drive circuit according to claim 17 for driving the step motor to rotate the time hand to indicate time.

19. A step motor drive circuit according to claim 11; wherein an area of the fifth transistor is larger than an area of the first transistor and an area of the sixth transistor is larger than an area of the third transistor.

20. An analog electronic timepiece comprising: a time hand for indicating time; a step motor for rotating the time hand to indicate time; and a step motor drive circuit according to claim 19 for driving the step motor to rotate the time hand to indicate time.

* * * * *